Inventors.
Peter Gerke, &
Otto Kneisel.
By [signature] Atty.

Inventors.
Peter Gerke, &
Otto Kneisel.
By [signature] Atty

Inventors,
Peter Gerke, &
Otto Kneisel.
By [signature] Atty.

Inventors.
Peter Gerke, &
Otto Kneisel.
By [signature] Atty.

2,974,201

CIRCUIT ARRANGEMENT FOR EXTENDING CONNECTIONS IN A TWO-STAGE COUPLING FIELD

Peter Gerke, Munich-Solln, and Otto Kneisel, Munich-Grosshesselohe, Germany, assignors to Siemens & Halske Aktiengesellschaft Berlin and Munich, a corporation of Germany Filed Jan. 14, 1959, Ser. No. 786,741

Claims priority, application Germany June 2, 1958

16 Claims. (Cl. 179—22)

Figures 1, 2:
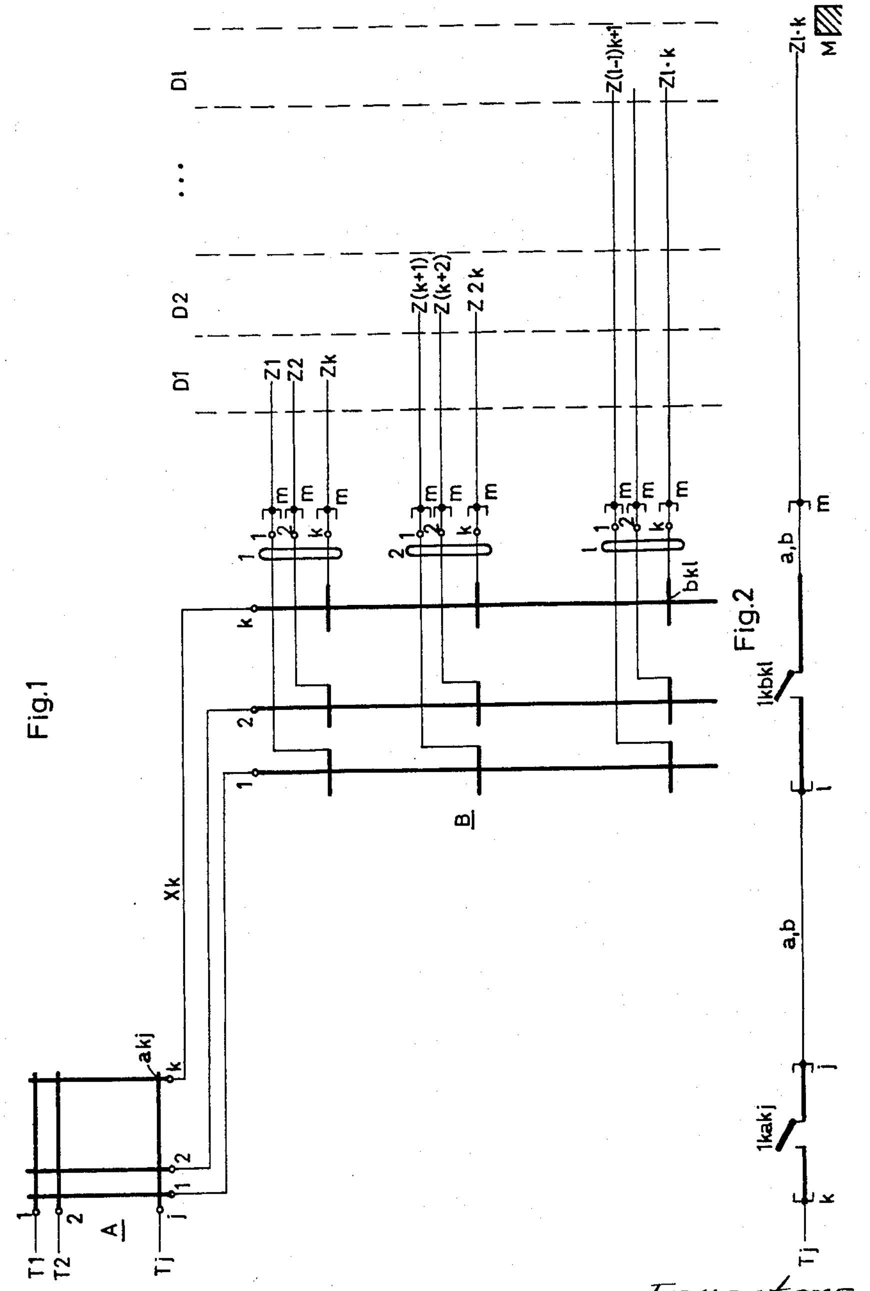

This invention is concerned with a circuit arrangement for routing, that is, for hunting, selecting and extending, idle connection paths between a predetermined inlet and an idle outlet of a desired outlet group, in a two-stage field of coupling points.

Fields of coupling points, sometimes, as for example in U.S. Patent No. 2,843,674, also referred to as "cross point networks," are used, for example, in extending calls in telephone systems; U.S. Patent No. 2,779,824 may be mentioned as a pertinent disclosure, showing in Fig. 1 a field of coupling points (cross point network) subdivided into three stages, each stage containing coordinate switches, the switching contacts of these switches being disposed at the socalled cross points or coupling points. Fields of coupling points are also disclosed in copending applications Nos. 760,238 and 762,656 and 785,425, respectively filed September 10, 1958, and September 22, 1958, and January 7, 1959, which are owned by the assignee also named in the present application. The present disclosure may be considered in the nature of a further development of the system and circuit arrangement described in the above mentioned copending application Serial No. 785,425, relating to a two-stage field of coupling points.

The two-stage field of coupling points of the copending application, briefly referred to as coupling field, comprises an inlet coupling multiple and an outlet coupling multiple respectively represented by switching means operating in the manner of coordinate switches and interconnected by trunk lines. The coupling point rows of a coordinate direction are in the inlet coupling multiple allotted to inlets and the coupling points in the outlet coupling multiple are allotted to individual outlets. The selection of idle connection paths is effected by means of a routing network, the line disposition of which corresponds to that of the coupling field. The selection of a connection path is in accordance with the copending application effected in one operation by utilizing a particular marking principle. In accordance with this principle, a potential signifying idle condition, briefly referred to as "idle potential," is placed on the idle outlets of the desired outlet group, and a potential signifying busy condition, briefly referred to as "busy potential" is placed on all busy inlets, such busy potential dominating at the corresponding coupling points of the outlet coupling multiple over the idle potential that may have been extended thereto. One of the coupling points of the outlet coupling multiple marked by idle potential is selected for extending a connection path, the determination of such coupling point determining the path between the predetermined inlet and a suitable outlet and therewith the routing of a connection and also determining those of the coupling point contacts which will be involved in switching the connection path through.

In the prior system, the extension of the busy potential of occupied trunk lines to the coupling points in the outlet coupling multiple belonging to an involved trunk line takes place by way of decoupling rectifiers. The coupling points of the outlet coupling multiple, disposed in rows which cross rows of coupling points belonging to trunk lines belong, moreover, to the same outlet group. The copending application describes various circuit or switching arrangements including switches for effecting selection among the coupling points of the outlet coupling multiple which are marked by idle potential.

The present invention provides an improved circuit or switching arrangement for carrying out the operations described in the copending application. This switching or circuit arrangement utilizes the network of seizure or private conductors as a routing network and the potential which appears in the network of private conductors as a busy criterion is utilized at occupied path portions, such as coupling field inlets, trunk lines and coupling field outlets, for the marking of the busy potential in the routing network.

Figure 3:
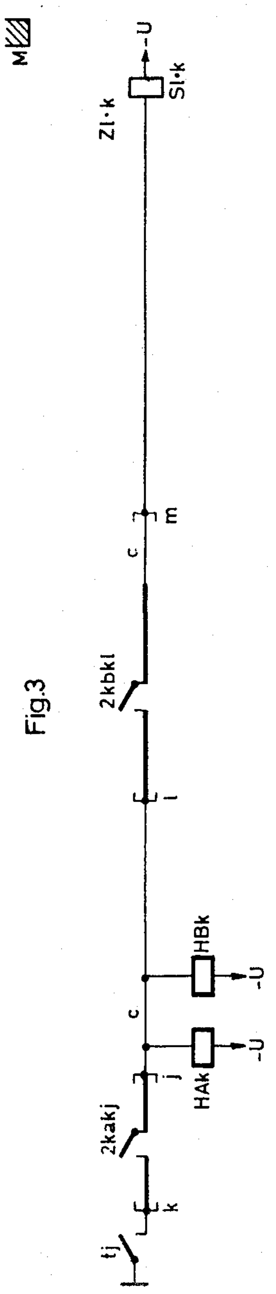
Figure 5:
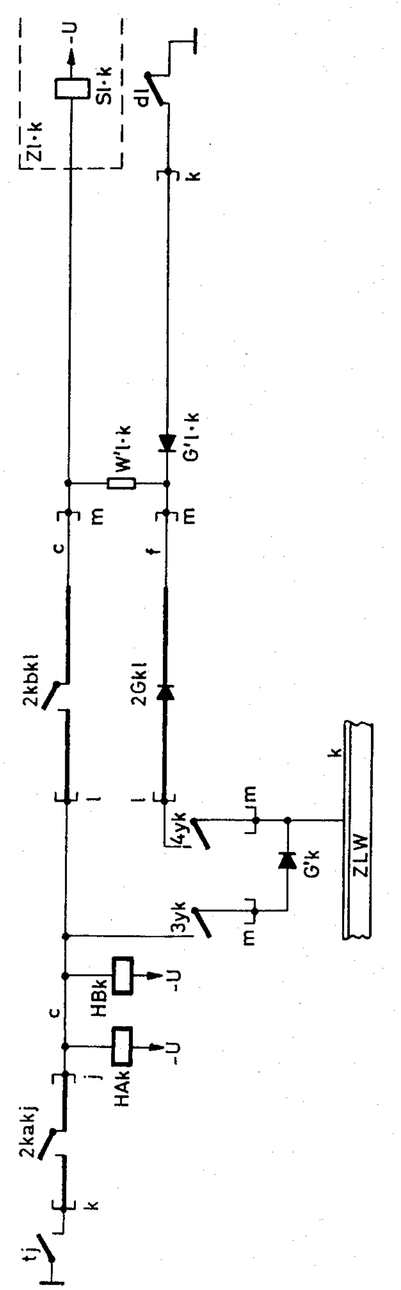
Figure 5A:
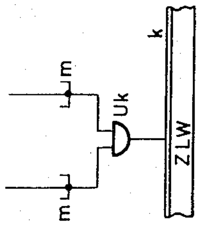
Figure 6:
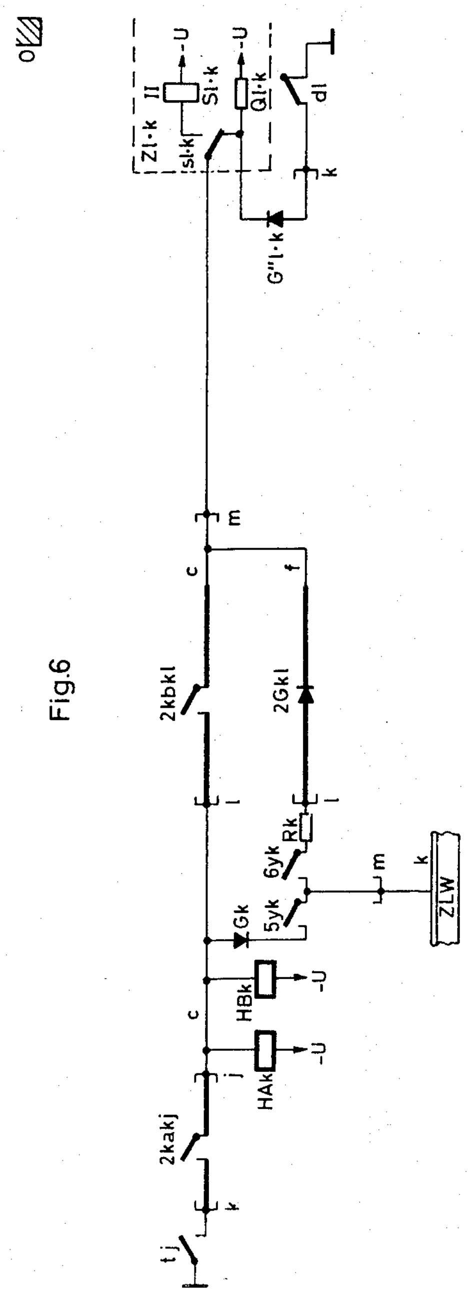
Figure 7:
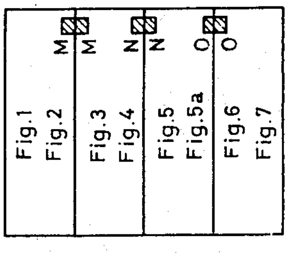

The various objects and features of the invention will appear from the description which will be rendered below with reference to the accompanying drawings. In these drawings:

Fig. 1 shows the grouping plan or scheme for the two-stage coupling field;

Fig. 2 indicates the course of line or speech current conductors *a* and *b* of a connection path extended between an inlet and an outlet of the coupling field;

Fig. 3 represents the course of the seizure or private conductor *c* belonging to the involved connection path, cross-coil switches being assumed to be used for actuating and holding the coupling point contacts;

Figs. 4, 5, 5*a* and 6 illustrate examples of various embodiments of the switching arrangement according to the invention; and Fig. 7 shows how the drawings should be assembled with the index marks M, N, O joined so that respectively associated switching and circuit elements will appear in proper alignment.

The structure of the coupling field shown in Fig. 1 and the representation of the line or speech current conductors *a*—*b* and the seizure or private conductor *c*, shown respectively in Figs. 2 and 3, will be explained first so as to aid understanding of the invention.

The two-stage coupling field shown in Fig. 1 comprises coupling stages A and B. Each coupling stage includes a coupling multiple constructed and operating in the manner of coordinate switching means; the first coupling stage thus including the inlet coupling multiple A and the second coupling stage including the outlet coupling multiple B. The inlet coupling multiple A has $k$ columns (vertical) and $j$ rows (horizontal). There are provided $j$ coupling field inlets which are allotted to the rows of the coupling field, these inlets including T1 to T$j$. To each column is connected a trunk line leading to a column of the outlet multiple B. The outlet multiple B accordingly has exactly as many columns as the inlet multiple, that is, $k$ columns, and it follows, therefore, that each of the rows of the outlet coupling multiple has $k$ coupling points. To the coupling points of the first row of the outlet coupling multiple B are allotted coupling field outlets Z1 to Z$k$; to the second row are allotted the outlets Z($k$+1) to Z2$k$; and to the last row are allotted the outlets Z($l$—1)$k$+1 to Z$l \cdot k$.

The coupling fields may be realized by the use of multiple switches including coordinate switches, that is, crossbar switches or cross-coil switches, or relay couplers. At each coupling point is provided a coupling element, which is operatively actuated when such coupling point is involved in the extension of a connection path, for setting its socalled coupling point contacts. Several such contacts may be provided at each coupling point. There is thus in the inlet coupling multiple at the crossing point of the $k$th column and the $j$th row, the coupling point $akj$ to which are allotted coupling point contacts $1kakj$ (Fig. 2), $2kakj$ (Figs. 3 to 6). These coupling point contacts are included in the networks of the line or speech current conductors $a$—$b$ and seizure or private conductors $c$, respectively.

Fig. 2 shows the course of the line conductors $a$—$b$ of a connection path extending between an inlet and an outlet, a particular one of the possible connection paths being assumed to give an example. Such connection path is determined by setting, that is, by closing the corresponding contacts in the course of the routing operation, these contacts being shown in Fig. 2 in normal or open position. The assumed connection path may, for example, extend from the coupling field inlet T$j$ to the coupling field outlet Z$l\cdot k$ by way of the contacts $1kakj$ and $1kbkl$. The multiple symbols $k$, $j$ and $l$, shown in connection with the contacts, indicate that a plurality of coupling point contacts are connected to a row of the corresponding coupling multiple. The meaning of the multiple symbol $m$ shown in the various figures at the outlet side of the coupling field will be presently explained.

Fig. 3 represents the course of the private conductor $c$ belonging to the line conductors $a$—$b$ shown in Fig. 2, such course being similar to that of the line conductors. The private conductor serves for the transmission of the seizure criterion. Contact $tj$ associated with the coupling field inlet T$j$ is for this purpose upon seizure of the inlet closed, thereby extending ground potential as a busy potential to the private conductor $c$. Relay S$l\cdot k$ belonging to the associated coupling field outlet Z$l\cdot k$ and being connected to the voltage —U, is thereby operatively actuated. The relay S$l\cdot k$ may be referred to as the outlet seizure relay.

The private conductor $c$ with its busy potential may also be employed for holding the setting or actuating means for the coupling point contacts, that is, coupling point contacts of the previously mentioned multiple switches, in actuated position for the duration of the seizure of the involved connection path.

The multiple switches may be cross-coil switches of the kind described in copending application Serial No. 573,039 which is likewise owned by the assignee named in the present case. Such a cross-coil switch comprises for the control of coupling point contacts mutually crossing row coils and column coils as well as holding coils. Upon energization of a row coil and a column coil, the contacts disposed at the crossing points of these coils will be actuated. The holding coils are disposed in parallel to the column coils and are provided for holding the contacts in actuated position. The operative range of the holding coils may be extended to embrace the rows of coupling point contacts in the inlet and outlet multiples which are respectively connected with trunk lines. The holding coils for these rows may then be connected to the corresponding trunk line conductors in the network of the private conductors, and may be energized by ground potential acting as busy potential so as to perform the holding function.

Fig. 3 showing the course of the private conductor for the connection between the coupling field inlet T$j$ and the coupling field outlet Z$l\cdot k$, also illustrates the holding coil HA$k$ for the $k$th column of the inlet coupling multiple A and holding coil HB$k$ for the $k$th column of the outlet coupling multiple B. These two holding coils are connected to the private conductor $c$ of the trunk line which interconnects the two $k$th columns. At one terminal of each of the holding coils HA$k$ and HB$k$ is the potential —U. Responsive to closure of contacts $tj$, ground potential is connected to the private conductor $c$ and the holding coils are energized provided, of course, that the coupling point contacts $2kakj$ and $2kbkl$ are closed. The holding coils accordingly can perform their holding function and hold the actuated contacts $2kakj$ and $2kbkl$ as well as further coupling point contacts in actuated position.

Figure 4:
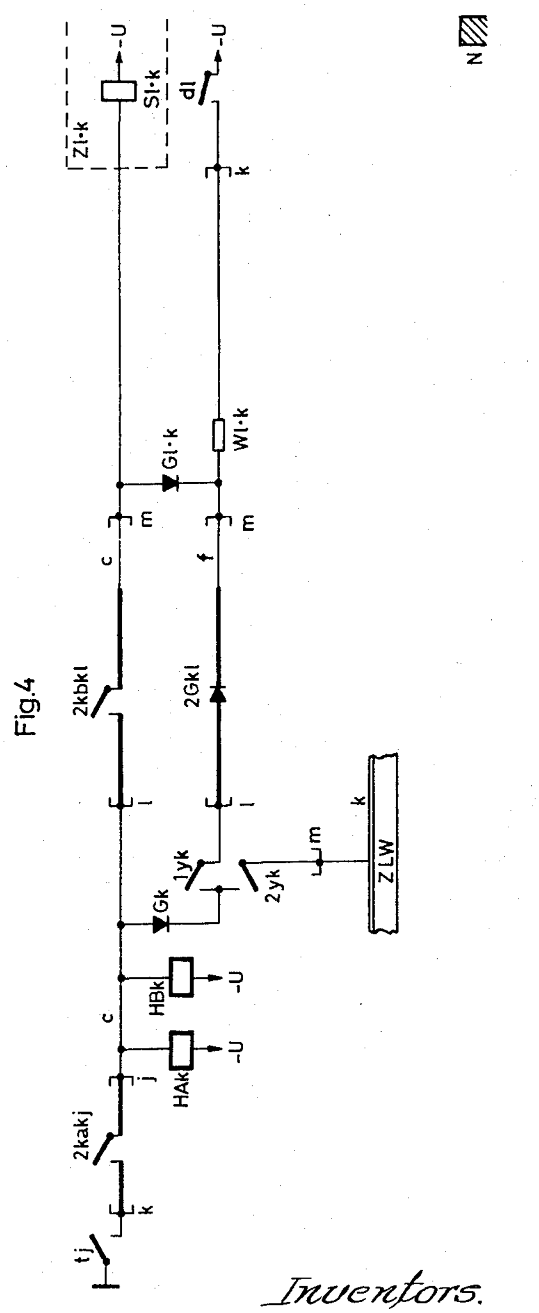

Figs. 4, 5, 5$a$ and 6 show examples of variants of the switching arrangement according to the invention. As Figs. 2 and 3, these figures illustrate only the course of conductors lying in a certain connection path and the switching means belonging to it, the connection path being again assumed to extend between the coupling field inlet T$j$ and the coupling field outlet Z$l\cdot k$. Figs. 4, 5, 5$a$ and 6 accordingly represent respectively only portions of the respective networks of conductors. In the corresponding switching arrangements, the routing network provided for the outlet coupling multiple B, includes the conductors marked as conductors $f$, which are on the inlet side connected over coincidence rectifiers to the conductors of the network of the private conductors $c$ of the trunk lines. The term "coincidence rectifier" will be presently explained. Of these coincidence rectifiers, Figs. 4 and 6 show the rectifiers G$k$. In Fig. 5, the rectifier G'$k$ corresponds to a plurality of these rectifiers. To each coupling point of the outlet coupling multiple B is in the routing network allotted a further rectifier, as in the switching arrangement according to the copending application, such rectifiers being indicated at 2G$kl$. Only the part of the routing network belonging to the outlet coupling multiple B is represented. The functions of its omitted parts are performed by the network of the private conductors. The outlet side of the routing network is also connected with the network of private conductors. This connection is in Figs. 4 and 5 effected by connecting each conductor of the routing network by way of a decoupling element with each corresponding conductor of the network of the private conductors.

In Fig. 4, the decoupling elements are rectifiers such as indicated at G$lk$, forming a coincidence gate with a resistor W$l\cdot k$ over which the corresponding routing conductor $f$ extends to the coupling field outlet. Contacts such as $dl$ (right hand end of Fig. 4) are provided at the coupling field outlets which serve for marking the desired outlet group. Contact $dl$ is closed when one of the outlets belonging to the corresponding row of the outlet coupling multiple B is available for a connection to be extended. These outlets form the outlet group D$l$ (Fig. 1). The contact $dl$ is common to all these outlets, the routing conductors of all the $k$-outlets being connected thereto as indicated by the multiple symbol $k$.

In the circuit according to Fig. 5, resistors such as W'$l\cdot k$ are used as decoupling members on the outlet side of the $c$ and $f$ conductors. This circuit differs on the outlet side from the one shown in Fig. 4, by the use of coincidence gate means with transposed position of the resistor and rectifier; the contact $dl$ (right hand end of Fig. 5) is moreover normally closed instead of open as in Fig. 4.

In the circuit according to Fig. 6, the corresponding $c$ and $f$ conductors are interconnected directly, requiring particular measures in connection with the coupling field outlets, which will be presently described.

The circuits according to Figs. 4, 5, 5$a$ and 6 are respectively operative in connection with coupling fields having individual inlets and individual routing networks for the outlet multiples which are in the networks of the $c$ and $f$ conductors respectively connected in multiple circuit to the same coupling field outlets. This is indicated by the multiple symbols $m$ appearing at the coupling field outlets, pointing to the fact that $m$ coupling fields are connected at the corresponding points, only part of one such coupling field being shown.

The coupling point selection is in all these $m$ coupling fields effected by means of a single central intermediate line switch ZLW. In order to effect the coupling point selection always solely dependent on the operating condition of that coupling field which contains the inlet involved in a call, there are provided contacts which will be operatively actuated only in connection with the involved coupling field, such control contacts being respectively operative to connect the intermediate line switch ZLW to the corresponding coupling field.

In the circuit according to Fig. 4, two such control contacts are in the routing network provided for each trunk line conductor, the two control contacts 1$yk$ and 2$yk$ shown in the figure belonging the $k$th trunk line conductor of the illustrated coupling field. Contacts such as 1$yk$ serve for switching through the connections to the trunk line conductors only in connection with the routing network of the coupling field in which path finding is to be effected; these contacts being otherwise open. Contacts such as 2$yk$ serve for connecting the inlets of the trunk line switch (which must have as many inlets as there are trunk lines in a coupling field) to the connections leading to the trunk line conductors of the routing network of the corresponding coupling field. These contacts are open in other coupling fields and the corresponding coupling fields therefore cannot affect the selection operation of the trunk line switch. All these contacts are, for example, controlled by a call allotter and marker which serves for effecting successive routing of calls, details of such call allotter and marker being omitted since it does not form part of the invention. The multiple symbol $m$ appearing at the illustrated $k$th input of the trunk line switch ZLW indicates that contacts such as 2$yk$ belonging to other coupling fields are connected with the corresponding point.

In the circuit according to Fig. 5, the contacts referred to are disposed differently. The conductors of the networks of private conductors of the trunk lines are in this case connected over contacts such as 3$yk$ which are mutipled at $m$, and the routing networks of the outlet coupling multiple B are on the inlet side connected over contacts such as 4$yk$, likewise multipled at a point marked $m$, all such contacts 3$yk$ and 4$yk$ being connected with associated coincidence rectifiers provided only in one set. This set of coincidence rectifiers, including the rectifier G$'k$, corresponds to rectifiers which are otherwise disposed in the connections extending to the trunk line conductors and leading to a single outlet coupling multiple, the coincidence rectifier G$'k$ being allotted to the $k$th conductors of the networks of private conductors of the trunk lines of all coupling fields. To the poles of the coincidence rectifiers of this set which extend in the direction of the outlet coupling multiple, are connected the $k$ inputs of the trunk line switch ZLW. Mutual interference between the various coupling fields is avoided by the closure of only those contacts in the routing, which belong to the coupling field including the inlet involved in a call to be extended.

The operation of the circuit according to Fig. 4 shall now be described more in detail.

At the coupling field outlets in the network of the private conductors, there is disposed a relay allotted to the corresponding outlet, such relay being upon seizure energized to indicate the busy condition. In connection with outlet Z$l\cdot k$, this is relay S$l\cdot k$ (right hand end of Fig. 4), one terminal of which is connected to the potential —U. Contacts $tj$, 2$kakj$ and 2$kbkl$ are closed responsive to setting of the connection path extending over the corresponding coupling points from the coupling field inlet T$j$ to the coupling field outlet Z$l\cdot k$. Ground potential is thereby extended to the private conductor and holding coils HA$k$ and HB$k$ are energized. This is the result of the routing which is effected by operations now to be described more in detail and involving determination of the connection path by selection of the coupling point to be employed in the outlet coupling multiple B.

It shall be assumed that a call is to be extended from the inlet T$j$ to a coupling field outlet of the outlet group D$l$ (Fig. 1), that is, to an outlet which is connected to the last row of the outlet coupling multiple B. The call allotter or call coordinator and marker effect operation of the control contacts of the corresponding coupling field. The $k$ inputs of the trunk line switch ZLW are connected to the coupling field by contacts including contact such as 2$yk$, and the routing network of this coupling field is connected to the corresponding conductors of the network of private conductors of the trunk lines, by those of the control contacts including the contact 1$yk$. The marker also effects operative actuation of contact $dl$ belonging to the desired outlet group. The idle potential (potential including idle condition) —U is now extended over resistors including the resistor W$l\cdot k$ and becomes effective in the routing network at the coupling points connected to these outlets in the outlet coupling multiple B.

The coupling point $kbkl$ shall now be considered. There are two possibilities for the condition of this coupling point. First, it may be disposed in a column of the outlet coupling multiple B in which no coupling point has yet been taken into use; in such case, the corresponding conductor in the network of private conductors of the trunk lines is likewise not yet involved for the holding of operatively actuated coupling point contacts, and such conductor accordingly is not connected to ground over a coupling point contact (such as 2$kakj$) in the inlet coupling multiple A, belonging to a switched-through connection path. The idle potential —U is accordingly connected to this conductor, over the resistor W$l\cdot k$, thereby being marked as belonging to a trunk line which is still available. The coupling point $kbkl$ can, however, also be disposed in a column of the outlet coupling multiple B containing a coupling point which is already being utilized for a connection path. The corresponding private conductor is in such case being used for holding the operatively actuated coupling point contacts in actuated position and is for such purpose connected to ground by way of coupling point contact 2$kakj$ of the inlet coupling multiple and contact $tj$. This ground potential now becomes effective over the rectifier G$k$ to the trunk line switch ZLW. There is no resistor in the circuit over which the ground potential is extended while the idle potential —U is extended by way of the resistor W$l\cdot k$. The result is, that the ground potential acting as a busy potential will dominate over the idle potential.

It will be seen that idle potential is supplied only to those of the inputs of the trunk line switch, which are connected to conductors belonging to available trunk lines. These inputs of the trunk line switch are activated by the idle potential —U, and the switch selects one of these inputs, thus determining the trunk line to be used for the connection path which is to be established. The determination of the trunk line also determines a coupling point in the outlet coupling multiple B, since the coupling points in such outlet multiple are column-wise allotted to the trunk lines and since a row of coupling points was previously determined by the desired outlet group. The coupling point to be used is the one lying at the crossing point of the corresponding column and row. One of the coupling points in the outlet multiple which is among those that carry idle potential is in this manner determined.

It may however happen that an idle connection path is available between the involved coupling field inlet T$j$ and the coupling field outlet Z$l\cdot k$, but that this outlet is already occupied by a connection path extending over another coupling field. Relay S$l\cdot k$ is in such case energized, and ground potential is connected at the multiple symbol $m$ from the other coupling field. This ground potential then acts by way of the decoupling rectifier G$l\cdot k$ as a busy potential with respect to the routing network and suppresses the idle potential since it dominates over the latter which is extended by way of the resistor W$l\cdot k$.

The decoupling rectifier G$l\cdot k$ also prevents propagation of ground potential over rectifiers G$k$ and 2G$kl$ to relay S$l\cdot k$. The coincidence rectifier G$k$ prevents detrimental effects of the potential —U lying on the holding coils HA$k$ and HB$k$ on the inputs of the trunk line switch ZLW. Without the interposition of this rectifier (which may be a diode rectifier as all the other rectifiers shown), the —U potential could become operative as an idle potential at the inputs of the trunk line switch, in the presence of idle condition of the corresponding trunk line conductor, even with the contact *dl* in open position. Rectifier G*k* prevents such malfunction.

The activation of the corresponding input of the trunk line switch ZLW therefore requires that the corresponding trunk line conductor is idle and that it has access to one of the desired and available outlets. The rectifier G*k* meets this coincidence requirement, thus acting as a coincidence rectifier.

The selection of a coupling point in the outlet coupling multiple B determines a definite connection path between the involved coupling field inlet and a coupling field outlet disposed in a desired outlet group. The problem posed here for the routing is thus solved. Switching arrangements employing various switching means for the setting of such definite connection paths have already been proposed; explanations concerning the operations incident to the setting are for this reason omitted.

The operation of the circuit shown in Fig. 5 will be described next. Relays are again provided in connection with the coupling field outlets, one such relay being shown at S*l*·*k* (right hand end of Fig. 5), which are respectively energized upon seizure of the corresponding outlets. To the private conductor belonging to a connection is again connected ground potential. The circuit corresponds in part to the one explained with reference to Fig. 4, the difference residing, as already mentioned, in mutually interchanged switching elements of the coincidence gates lying at the coupling field outlets, etc., and in the provision of only one set of coincidence rectifiers extending to the trunk line conductors, etc. The operation of the circuit according to Fig. 5 is similar to that of Fig. 4, and the explanations referring to Fig. 5 will therefore particularly consider those operations which differ due to differences in the circuit elements.

Control contacts 3*yk* and 4*yk* will be closed by the operation of the call allotter and marker when a call is to be extended from a coupling field inlet, and contact *dl* (right hand end of Fig. 5) belonging to a desired outlet group will be opened. The desired outlet group includes the outlet Z*l*·*k* (see also Fig. 1). Since contact *dl* is open, the —U potential to which relay S*l*·*k*, allotted to this outlet, is connected, can become operative, as an idle potential with respect to the coupling point *kbkl* by way of resistor W'*l*·*k*. It is of course assumed that the galvanic connection from the corresponding coupling field outlet Z*l*·*k* to the outlet coupling multiple B is undisturbed so that the idle potential can appear at the involved outlet multiple. It is further assumed that this coupling field outlet is not occupied by a connection extending from another coupling field, in which case ground potential would be as a busy potential on the corresponding *c* conductor. The outlet Z*l*·*k* must also belong to the desired outlet group, contact *dl* which determines this group being opened to prevent extension of ground potential over rectifier G'*l*·*k* in the routing network which would exclude consideration of the corresponding coupling point in the selection of a connection path.

The idle potential —U will become effective at the coupling point *kbkl* responsive to opening of contact *dl*. This idle potential at the coupling point *kbkl* will either be suppressed or not suppressed depending upon the operating condition (busy or idle) of the connected conductor of the network of private conductors of the trunk lines. If the idle potential is suppressed, the coupling point will not be considered incident to the selection operation of the trunk line switch ZLW; if not suppressed, it will be considered. The control contacts 3*yk* and 4*yk* and corresponding control contacts of the concerned coupling field are also closed. The inputs of the switch ZLW are thus connected to the coupling field by way of these control contacts. The trunk lines and coupling points belonging to these switch inputs will be considered in the selection operation of the switch ZLW, provided that idle potential is connected thereto. A connection path is determined and the object of the circuit is achieved after the trunk line switch ZLW has selected trunk line and therewith, as in the circuit according to Fig. 4, a coupling point in the outlet coupling multiple B.

Attention may be called to the coincidence rectifier G'*k* which prevents detrimental effects of the potential —U at the holding coils HA*k* and HB*k* on the inputs of the switch ZLW. The rectifier G'*l*·*k* and other similar rectifiers prevent propagation of busy potential from the private conductors *c* by way of multiple points *k* to coupling points associated with idle outlets. The resistors such as W'*l*·*k* over which the idle potential —U is extended enable the busy potential which is extended over a path free of resistor, to dominate at the coupling points over the idle potential extended thereto.

The circuit according to Fig. 5 may be operated in a manner different from that so far described. The coincidence rectifier G'*k* and similar rectifiers may be substituted by and coincidence gates such as U*k*, shown in Fig. 5*a*. These coincidence gates will deliver at their outputs an activating potential for the inputs of the trunk line switch connected thereto, when idle potential is simultaneously extended to both inputs thereof. The idle potential for the input lying at the control contact 4*yk* would be delivered as before, from the involved coupling field outlets; the idle potential for the input lying at the control contact 3*yk* would be delivered from the holding coils HA*k* and HB*k*, provided that the corresponding trunk line conductor is idle and, therefore, not on ground potential. The current on the holding coils would have to be non-operate current, that is, current insufficient to effect operation of the holding coils. The potential —U on the holding coils would operate as idle potential at the corresponding input of the coincidence gate. The circuit would otherwise operate exactly as described in connection with Fig. 5.

The particular features and operation of the circuit according to Fig. 6 will now be described. In this circuit, the structure of the networks of the *c* and *f* conductors and the function of the control contacts correspond to those of the circuit according to Fig. 4. The difference resides in the circuitry of the coupling field outlets. In Fig. 6, the relays allotted to the coupling field outlets, which may be referred to as outlet seizure relays, are respectively provided with a switch-over contact such as contact *sl*·*k* (relay S*l*·*k*) which performs an important function in the operation of the circuit. To the central spring of the contact is connected the corresponding conductor of the network of private conductors. The normal side of the contact is at —U idle potential by way of protective resistor Q*l*·*k*. This resistor corresponds in its dimensioning to the resistor W*l*·*k* or W'*l*·*k* of the two previously explained circuits. Also connected to the normal side of the contact is the rectifier G''*l*·*k* which is in series with contact *dl*, the latter contact serving for marking the respectively associated outlet group. As indicated by the multiple symbol *k*, all *k* coupling field outlets belonging to a row of the outlet multiple B are connected with contact *sl*·*k*. This contact is normally closed and is opened incident to the routing operation if it belongs to the desired outlet group. The contact operates exactly like the corresponding contact *dl* in the circuit according to Fig. 5. To the make or working side of the contact *sl*·*k* is connected the outlet seizure relay S*l*·*k* one terminal of which is connected to the idle potential —U. The remaining coupling field outlets are similarly circuited. Another feature which distinguishes this circuit from those previously explained resides in the provision of a current limiting resistor such as R*k* disposed in the routing networks of the outlet multiples in series with the coincidence rectifier such as G$k$ extending from the trunk line conductor $c$ to the corresponding row of the outlet multiple. The resistor R$k$ limits the current flowing in the routing operation over the rectifiers G$k$ and 2G$kl$.

To give an example, it shall be assumed again that a connection is to be extended from the coupling field inlet T$j$ to an outlet of the outlet group D$l$ (Fig. 1). The control contacts 5$yk$ and 6$yk$ will be closed and contact $dl$ will be opened. The idle potential —U which previously was suppressed by ground potential over contact $dl$ is now extended over resistor Q$l\cdot k$ to the network of the routing conductors $f$ of the outlet multiple B. The conditions which must thereby be satisfied include, first, that the corresponding coupling field outlet is idle (ground potential would otherwise be on the private conductor) and second, that there is no interruption between the corresponding coupling field outlet and the outlet multiple B. The idle potential appears as in the previously explained circuits at those coupling points of the outlet coupling multiple B which belong to idle coupling field outlets of a desired outlet group, the trunk lines of which are not occupied. The trunk line switch ZLW which is connected by way of the control contacts selects as in the other circuits in one selection operation a trunk line and therewith a coupling point of the outlet coupling multiple B or of the associated coupling field outlet.

A definite connection path is therewith selected and determined. This connection path can thereafter be completed by actuation of the associated coupling point contacts at the coupling points $akj$ and $bkl$. It may be mentioned in addition that the outlet seizure relay S$l\cdot k$ is in suitable manner energized, actuating its contact $sl\cdot k$ and holding itself operated over the contact for the duration of the call.

It shall now be shown that no mutual disturbing effects or other disturbances occur between the coupling field outlets despite the direct connection, on the outlet side, of the routing network with the corresponding private conductors.

In the circuit according to Fig. 6, the contact such as $dl$ associated with the desired outlet group is opened exactly as in the circuit according to Fig. 5. The latter circuit comprises the coincidence gate with the resistor W'$l\cdot k$ and the rectifier G'$l\cdot k$. The function of the resistor W'$l\cdot k$ is assumed in Fig. 6 by the resistor Q$l\cdot k$ which permits, exactly as the resistor W'$l\cdot k$ domination of the busy potential over the idle potential at the coupling points. The function of the rectifier G'$l\cdot k$ is assumed by the rectifier G''$l\cdot k$ which prevents, exactly as G'$l\cdot k$ extension of the busy potential from the seized (occupied) coupling field outlets over the multiple $k$ to idle outlets. It must be considered in this connection that ground potential is in the case of occupied coupling field outlets at the switch-over contact of the oulet seizure relay, which is supplied from the corresponding conductor of the network of the private conductors. The rectifier G''$l\cdot k$ prevents the extension of this ground potential to other coupling field outlets so long as the switch-over contact is in normal position. The outlet seizure relay is held actuated for the duration of the call over its winding II by way of its actuated contact $sl\cdot k$. The switch-over contact assures release of the outlet seizure relay at the termination of a call responsive to removal of the ground potential at the involved private conductor.

In the described circuits, the outlets of an outlet group belong respectively to coupling points lying in one and the same row of the outlet coupling multiple B. These circuits may also be constructed so that the respective outlet groups embrace the outlets of more than one row of the outlet coupling multiple B. In such case, not only the $k$ but 2$k$ or 3$k$, etc., that is, all coupling field outlets of the corresponding rows are to be connected at the corresponding contacts for the marking of the outlet groups. The trunk line switch ZLW will then have, for example, as many inputs as there are coupling points belonging to an outlet group and will effect selection, not only among the trunk lines, but also among the coupling points connected to the same trunk line and belonging to the same outlet group.

The circuits according to Figs. 4, 5, 5$a$ and 6 differ by combinations of circuit peculiarities contained therein. These circuit peculiarities may be combined as may be desired.

Changes may be made within the scope and spirit of the appended claims which define what is believed to be new and desired to have protected by Letters Patent.

We claim:

1. In a telephone system having a coupling field for extending connections to be established, said coupling field having an inlet coupling multiple and an outlet coupling multiple represented respectively by switching means operating in the manner of coordinate switches, trunk lines extending between said coupling multiples, means forming coupling points in the respective coupling multiples, the coupling points in said inlet multiple being multipled column-wise and row-wise and the coupling points in said outlet coupling multiple being multipled solely column-wise and respectively allotted to individual outlets disposed in groups, a circuit arrangement for routing connections to be established between inlets of said inlet coupling field and idle outlets of desired outlet groups in said outlet coupling field, said arrangement comprising a routing network comprising private conductors which are respectively allotted to said trunk lines and routing conductors which are respectively cooperatively connected with said private conductors, means for connecting to idle outlets of a desired outlet group a first potential signifying the idle condition thereof, means for connecting to all busy inlets a second potential signifying the busy condition thereof, said second potential appearing on the private conductors of the respective trunk lines, circuit means including decoupling rectifier means for extending said second potential by way of said routing conductors to coupling points involved in the extension of a connection, said second potential dominating at said coupling points over said first potential extended thereto from said outlets, and means for selecting, from the coupling points of the outlet coupling multiple carrying said first potential, an outlet and thereby determining the routing of the desired connection path.

2. A system and circuit arrangement according to claim 1, comprising coincidence switching means for connecting the network of routing conductors for the outlet coupling multiple on the inlet side thereof with conductors of the network of private conductors.

3. A system and circuit arrangement according to claim 1, comprising decoupling switching means for connecting the network of routing conductors for the outlet coupling multiple on the outlet side thereof with conductors of the network of private conductors leading to the coupling field outlets.

4. A system and circuit arrangement according to claim 1, comprising coincidence switching means for connecting the network of routing conductors for the outlet coupling multiple on the inlet side thereof with conductors of the network of private conductors, and decoupling switching means for connecting the network routing conductors on the outlet side thereof with conductors of the network of private conductors leading to the coupling field outlets.

5. A system and circuit arrangement according to claim 1, comprising decoupling switching means for connecting the network of routing conductors for the outlet coupling multiple on the outlet side thereof with conductors of the network of private conductors leading to the coupling field outlets, resistor means for connecting said first potential in the routing network to the coupling field outlets belonging to the desired outlet group, said decoupling means being operative to suppress said first potential by the effect of said second potential.

6. A system and circuit arrangement according to claim 1, comprising decoupling switching means for connecting the network of routing conductors for the outlet coupling multiple on the outlet side thereof with conductors of the network of private conductors leading to the coupling field outlets, comprising resistor means for extending from the network of private conductors said second or said first potential respectively placed thereon, and decoupling rectifier means in the routing network for extending said second potential only to outlets belonging to undesired outlet groups.

7. A system and circuit arrangement according to claim 1, comprising coincidence switching means for connecting the network of routing conductors for the outlet coupling multiple on the inlet side thereof with conductors of the network of private conductors, means for connecting the routing network of the outlet coupling multiple on the outlet side thereof directly with conductors of the network of private conductors leading to coupling field outlets, and current limiting resistor means disposed respectively in series with the coincidence switching means extending to corresponding trunk lines.

8. A system and circuit arrangement according to claim 1, comprising coincidence switching means for connecting the network of routing conductors for the outlet coupling multiple on the inlet side thereof with conductors of the network of private conductors, means for connecting the routing network of the outlet coupling multiple on the outlet side thereof directly with conductors of the network of private conductors leading to coupling field outlets, current limiting resistor means disposed respectively in series with the coincidence switching means extending to corresponding trunk lines, comprising protective resistor means for extending the said first potential for an idle coupling field outlet to the corresponding conductor of the network of private conductors, outlet seizure relay means, and switch-over contact means controlled by an outlet seizure relay in the busy condition of said coupling field outlet for disconnecting said resistor means and connecting instead a winding of said relay in the corresponding circuit.

9. A system and circuit arrangement according to claim 1, comprising coincidence switching means for connecting the network of routing conductors for the outlet coupling multiple on the inlet side thereof with conductors of the network of private conductors, means for connecting the routing network of the outlet coupling multiple on the outlet side thereof directly with conductors of the network of private conductors leading to coupling field outlets, current limiting resistor means disposed respectively in series with the coincidence switching means extending to corresponding trunk lines, comprising protective resistor means for extending said first potential for an idle coupling field outlet to the corresponding conductor of the network of private conductors, outlet seizure relay means, switch-over contact means controlled by an outlet seizure relay in the busy condition of said coupling field outlet for disconnecting said resistor means and connecting instead a winding of said relay in the corresponding circuit, said second and said first potential being respectively extended by way of said protective resistor means, and rectifier means for extending said second potential to those of the protective resistor means which belong to undesired outlet groups.

10. A system and circuit arrangement according to claim 1, comprising coincidence switching means for connecting the network of routing conductors for the outlet coupling multiple on the inlet side thereof with conductors of the network of private conductors, said outlet groups embracing outlets respectively disposed in a single one of those of the rows which are in the outlet coupling multiple in crossing relationship with columns of coupling points, said routing network containing a trunk line switch for the outlet coupling multiple, the inputs of said trunk line switch being connected at interconnections extending between said coincidence switching means and said routing network for said outlet coupling multiple, said trunk line switch being operative to select one of its inputs which has been activated by said first potential, said selected input with the respectively associated private conductor determining the column belonging to it in the outlet coupling multiple and therewith determining the crossing point between such column and the row containing the coupling point in the desired outlet group.

11. A system and circuit arrangement according to claim 1, comprising a plurality of coupling fields having respectively individual inlets and having routing networks for the corresponding outlet coupling multiples and connected in multiple circuit to the same outlets thereof, a single centrally disposed trunk line selector for effecting selection of coupling points, and control contact means for controlling said selector depending upon the operating condition of the inlets of the coupling field containing the inlet from which a connection path is to be extended.

12. A system and circuit arrangement according to claim 11, comprising coincidence switching means connected between conductors of the network of private conductors and the routing network and containing said control contact means, a connection extending from multiple disposed inputs of said selector to said private conductors and the routing network, and further control contact means in said last named connection, said control contact means being operatively actuated only with respect to the coupling field involved in the routing to be effected.

13. A system and circuit arrangement according to claim 1, comprising rectifier means disposed in connections extending between conductors of the network of private conductors and the routing network for the outlet coupling multiple, said rectifier means functioning as coincidence switching means.

14. A system and circuit arrangement according to claim 11, comprising first and second control contact means disposed respectively in multiple circuits, circuit means respectively including said first and second control contact means for respectively connecting the conductors of the networks of private conductors and the routing networks of the outlet coupling multiple on the inlet side with coincidence switching means contained in a set corresponding to a single outlet coupling multiple, the inputs of said selector being connected with said coincidence switching means, said control contact means being operatively actuated only with respect to the coupling field involved in the routing to be effected.

15. A system and circuit arrangement according to claim 14, comprising cross-coil selector means for operatively actuating coupling point contacts and for holding such contacts in operated position, holding coils for the rows of coupling point contacts connected to the conductors of the corresponding network of private conductors, and means for connecting said first potential to said holding coils.

16. A system and circuit arrangement according to claim 15, wherein the inputs of the respective gates are operatively respectively affected from the private conductors and from the routing conductors of the corresponding outlet coupling multiples, the outputs of said gates being connected with said trunk line switch.

No references cited.